United States Patent [19]

Turner et al.

[11] 3,852,112

[45] Dec. 3, 1974

[54] ACTIVATION OF NICKEL BATTERY PLATES

[75] Inventors: Trevor Stanley Turner, Kidderminster; John Edward Whittle, Sutton Coldfield, both of England

[73] Assignee: The International Nickel Company, Inc., New York, N.Y.

[22] Filed: Feb. 8, 1973

[21] Appl. No.: 330,695

Related U.S. Application Data

[62] Division of Ser. No. 107,422, Jan. 18, 1971, abandoned.

[52] U.S. Cl. ........................ 136/29, 136/76, 204/49
[51] Int. Cl. ........................................... H01m 43/04
[58] Field of Search ......... 136/29, 28, 154, 155, 76; 204/49

[56] References Cited
UNITED STATES PATENTS

| | | | |
|---|---|---|---|
| 2,937,219 | 5/1960 | Minnick et al. | 136/154 |
| 3,239,384 | 3/1966 | Meyers | 136/154 |
| 3,269,864 | 8/1966 | Ackermann | 136/29 |
| 3,335,033 | 8/1967 | Kober | 136/29 |
| 3,417,005 | 12/1968 | Baig | 204/49 |
| 3,454,376 | 7/1969 | Luce et al. | 204/49 |
| 3,458,407 | 7/1969 | Wrangell | 136/29 |
| 3,579,383 | 5/1971 | Turner | 136/76 |

Primary Examiner—Winston A. Douglas
Assistant Examiner—C. F. Lefevour

[57] ABSTRACT

Electrolytic process for activating essentially solid nickel surfaces, e.g., nickel foil, for use as the positive electrodes in alkaline storage batteries. The electrolyte contains in solution a nickel salt, ammonia and an ammonium salt having the same anion as the nickel salt.

5 Claims, No Drawings

ACTIVATION OF NICKEL BATTERY PLATES

This application a division of U.S. Pat. Ser. No. 107,422 filed Jan. 18, 1971, now abandoned.

The invention is directed to the preparation of positive electrodes suitable for use in alkaline storage batteries.

Activated sintered nickel plates have found wide application as positive electrodes in alkaline storage batteries. However, because sintered nickel plates are porous and have diffused bonds, they are not characterized by a strength and ductility comparable to that of a dense, thin sheet material. It has been recognized that a thin, activated metal foil, for example, nickel foil, is potentially a superior positive electrode material because, by employing such foil, the final size of a storage battery may be substantially reduced. Further, batteries having activated foil electrodes are able to produce very high discharge rates for short periods at a substantially constant potential. This property is in contradistinction to the discharge of a capacitor which, though capable of a high discharge rate, exhibits a potential which decays exponentially with time.

In the copending U.S. application Ser. No. 842,347 now U.S. Pat. No. 3,579,383 of T. S. Turner, filed July 16, 1969, there is described a process for activating nickel foil or sheet in order to render it suitable for use as an electrode in an alkaline storage battery. In this process the foil or sheet is anodically treated in an aqueous electrolyte containing a nickel ammine complex, the so-called active mass being deposited from the electrolyte onto the foil or sheet which constitutes the anode in the electrolytic process. The active mass deposited is the black form, NiO(OH), and is substantially adherent to the solid nickel surface. The nickel ammine complex is formed by the addition of ammonia to an aqueous solution of a nickel salt which may be nickel nitrate, nickel acetate, nickel sulfate or nickel chloride. The process is distinguished from the slower prior art processes for foil activation which entirely rely on corrosion of the foil to provide the battery active mass.

In the above-mentioned copending application, nickel nitrate is pointed out as a most advantageous nickel salt for use in the electrolyte. Further, the ratio of ammonia to nickel (gram-molecules to gram-ions) in the electrolyte is described therein as being maintained at a value between 0.1 to 3 when the current density lies in the advantageous range of from 10 to 50 mA/cm$^2$ (milli-amperes per square centimeter). However, current density may fall in the range from 0.1 to 1000 mA/cm$^2$ or, more desirably, from 10 to 500 mA/cm$^2$. While the temperature of the electrolyte is maintained advantageously in the range from about 20°C. to about 30°C. and should not exceed 35°C., the process is operable below room temperature, even as low as 0°C. The treatment may be conducted for periods ranging from as short as 5 minutes to 2 or 3 hours or more. High solution concentrations of nickel nitrate can be obtained. Desirably, the Ni(NO$_3$)$_2$·6 H$_2$O concentration is kept above 100 g/l. (grams per liter) and up to the saturation point, e.g., 800 to 1000 g/l.

The process described above has been successfully employed to activate nickel foil electrodes, but since, in practice, the electrolytes are maintained in use for long periods of time for activating large quantities of foil or sheet, it is found that in the course of time they tend to become unstable, and the amount of active mass formed in a given time tends to vary.

It has now been discovered that the stability of the electrolyte, and the uniformity of the amount of active mass formed, are much improved by the addition to the electrolyte of an appropriate ammonium salt.

It is an object of the invention to provide in the manufacture of plates for alkaline batteries, an anodic deposition process for activating solid nickel surfaces wherein the deposition of battery active mass is carried out in a nickel-ammine electrolyte stabilized by an ammonium salt.

It is a further object of the invention to provide a stable electrolyte containing a nickel-ammine complex which is suitable for the activation of solid nickel surfaces by the addition to the electrolyte of an ammonium salt that has the same anion as the nickel salt from which the complex was formed.

Other objects and advantages will become apparent in the following description.

Generally speaking, the electrolyte in accordance with this invention is an aqueous solution of a nickel salt, ammonia and an ammonium salt that has the same anion as the nickel salt, the ammonium salt being present in an amount such that the ratio of the molar concentration of the ammonium salt to that of the nickel salt is at least 0.1:1, but does not exceed 3:1. At higher ratios the nickel anode is corroded to an undesirable extent. A suitable ratio is from 1:1 to 1.5:1.

Advantageously, the two salts used in preparing the electrolyte are nickel nitrate and ammonium nitrate. The ratio of ammonia to nickel (gram-molecules to gram-ions) in the electrolyte is beneficially from 0.1 to 3, as described in copending U.S. Application Ser. No. 842,347, and the temperature of the electrolyte and the current density employed also fall in the ranges set forth in that application.

Examples of electrolytes according to the invention, the concentrations of the salts and ammonia being given in gram-molecules, are set forth in the following Table.

TABLE

| Electrolyte | Nickel Nitrate | Ammonium Nitrate (gram-molecules) | Ammonia | Ratio of Ammonium Nitrate to Nickel Nitrate | Weight gain mg |
|---|---|---|---|---|---|
| 1 | 1 | 0.75 | 3 | 0.75:1 | 18 |
| 2 | 1.5 | 1.25 | 4.5 | 0.83:1 | 19 |
| 3 | 2 | 1.5 | 6 | 0.75:1 | 25 |
| 4 | 1 | 1.25 | 3 | 1.25:1 | 9 |
| 5 | 1.5 | 1.87 | 4.5 | 1.25:1 | 15 |
| 6 | 2 | 2.5 | 6 | 1.25:1 | 17 |
| 7 | 1 | 2.0 | 3 | 2:1 | 6 |
| 8 | 1.5 | 3.0 | 4.5 | 2:1 | 9 |
| 9 | 2 | 4.0 | 6 | 2:1 | 20 |

Each electrolyte was kept for two months and then examined. Electrolytes 1 to 3 showed a slight precipitate, amounting to 1% by volume of the solution in Electrolyte 1, less than 1% in Electrolyte 2 and very slight in Electrolyte 3. Electrolytes 4 to 6 showed very slight turbidity. Electrolytes 7 to 9 did not even show turbidity, but in use tended to corrode nickel anodes slightly. In contrast, in an electrolyte without the stabilizing addition which contained 825 g/l. (grams per liter) of $Ni(NO_3)_3 \cdot 6H_2O$ and sufficient 0.880 ammonia to give a ratio of $NH_3/Ni^{2+}$ equal to 2.75 (Example V of U.S. Application Ser. No. 842,347), 30% of the solution by volume had precipitated after two months.

The capacity of each of the nine electrolytes according to the invention for the production of active mass was evaluated by ascertaining the gain in weight of a circular nickel sheet 3.2 mm. thick and of total area 6 $cm^2$, when immersed as the anode in the electrolyte through which a current was passed for 2½ hours at an anode current density of 18 $mA/cm^2$, the temperature being 20°C. The gains in weight are shown in the Table above.

It will be understood that the essentially solid nickel surfaces such as nickel foil which are activated in accordance with this invention may be perforated to a considerable degree, e.g., up to 10% hole area or more.

The present invention thus provides a means for stabilizing nickel-amine solutions used in activating battery plates so that it becomes practical to use such solutions for prolonged periods in activating large quantities of foil or sheet.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. In a process for activating a solid nickel surface for use as a positive electrode in alkaline storage batteries wherein the said solid nickel surface is anodically treated for at least 5 minutes at an anode current density of about 0.1 to 1000 $mA/cm^2$ in an aqueous electrolyte at a temperature not exceeding 35°C. which contains in solution ammonia and a nickel salt selected from the group consisting of nickel nitrate, nickel acetate, nickel sulfate and nickel chloride, the ratio of gram-molecules of ammonia to grams-ions of nickel being from 0.1 to 3, whereby a battery active mass of NiO(OH) is deposited on said nickel surface; the improvement for stabilizing the electrolyte comprising adding to the electrolyte an ammonium salt having the same anion as the nickel salt, the ratio of the molar concentration of the ammonium salt to that of the nickel salt being at least 0.1:1 but not exceeding 3:1.

2. The process of claim 1 in which the said solid nickel surface is nickel foil.

3. The process according to claim 2 in which the ratio of the molar concentration of the ammonium salt to that of the nickel salt is from 1:1 to 1.5:1.

4. The process according to claim 2 in which both of said salts are nitrates.

5. The process according to claim 3 in which both of said salts are nitrates.

* * * * *